(12) United States Patent
Loibl

(10) Patent No.: US 6,181,574 B1
(45) Date of Patent: Jan. 30, 2001

(54) CONTROL DEVICE, IN PARTICULAR FOR AN AUTOMATIC MOTOR VEHICLE TRANSMISSION

(75) Inventor: Josef Loibl, Regen (DE)

(73) Assignee: Siemens Aktiengesellscahft, Munich (DE)

( * ) Notice: Under 35 U.S.C. 154(b), the term of this patent shall be extended for 0 days.

(21) Appl. No.: 09/123,826

(22) Filed: Jul. 28, 1998

(30) Foreign Application Priority Data

Jul. 28, 1997 (DE) .................................. 197 32 474

(51) Int. Cl.⁷ ........................................ H05K 9/00
(52) U.S. Cl. ................ 361/816; 361/800; 361/677; 439/5; 439/132; 439/196
(58) Field of Search ................. 361/677, 800, 361/816, 517; 439/5, 132, 196

(56) References Cited

U.S. PATENT DOCUMENTS

| | | | |
|---|---|---|---|
| 3,727,735 | * 4/1973 | La Flame | 192/58 B |
| 4,779,460 | * 10/1988 | Cruickshank | 73/313 |
| 5,392,197 | * 2/1995 | Cuntz et al. | 361/818 |
| 5,941,137 | * 8/1999 | Beer et al. | 57/2 |

FOREIGN PATENT DOCUMENTS

| | | |
|---|---|---|
| 9307228 | 8/1993 | (DE) . |
| 19501895A1 | 7/1996 | (DE) . |
| 0758726A2 | 2/1997 | (EP) . |

* cited by examiner

*Primary Examiner*—Leo P. Picard
*Assistant Examiner*—Hung Van Duong
(74) *Attorney, Agent, or Firm*—Herbert L. Lerner; Laurence A. Greenberg; Werner H. Stemer

(57) ABSTRACT

A control device, in particular for controlling an automatic motor vehicle transmission, includes an electronic circuit mounted on a substrate. The circuit is accommodated in a housing which is sealed with respect to a surrounding fluid, and is connected to electrical conductors that run outside the housing. The housing contains a filler which is formed of a viscous fluid and is compatible with surrounding fluid. The filler is preferably transmission oil.

5 Claims, 1 Drawing Sheet

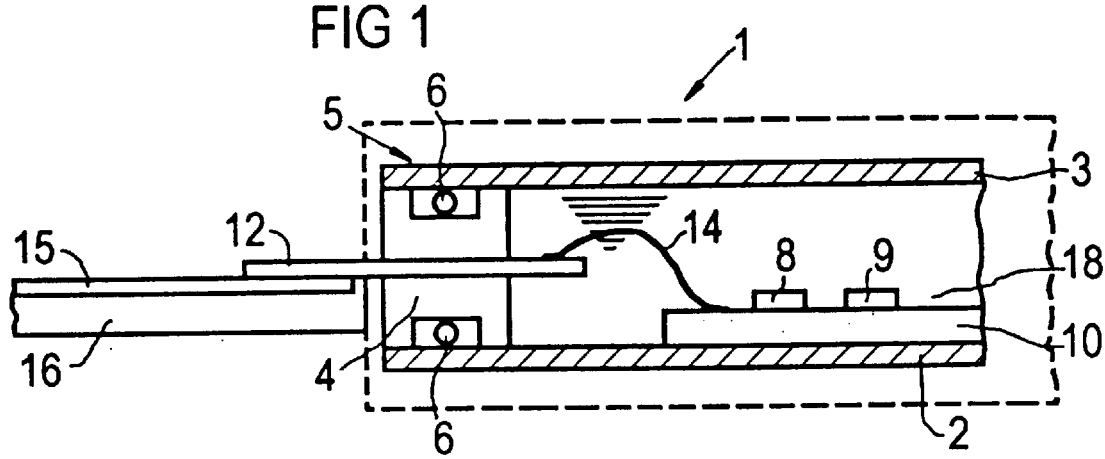
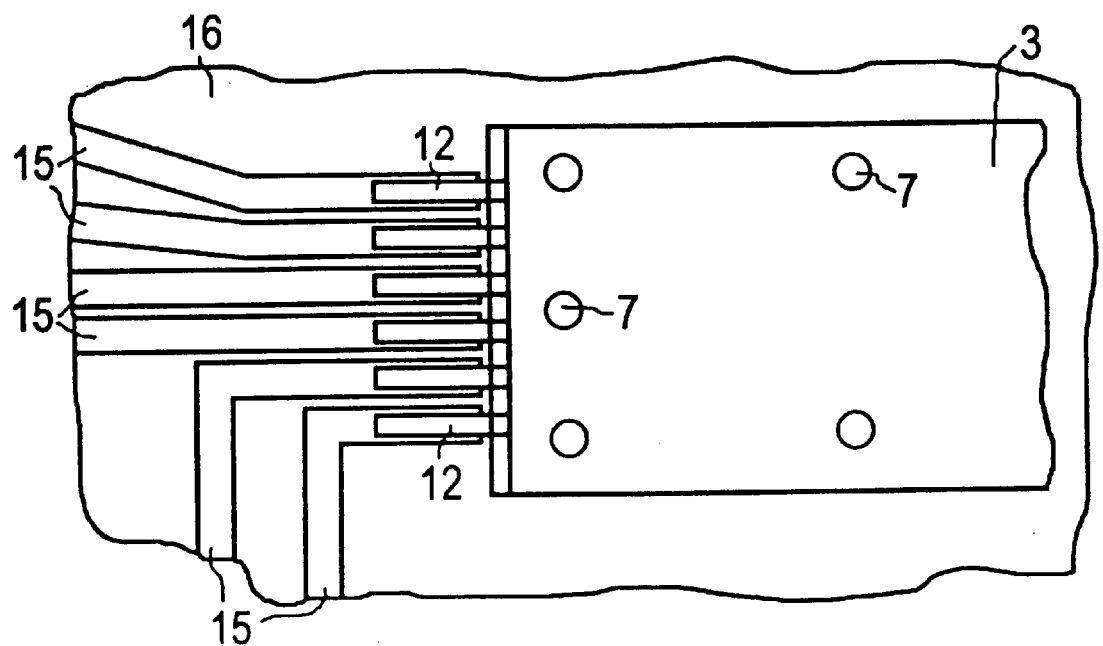

CONTROL DEVICE, IN PARTICULAR FOR AN AUTOMATIC MOTOR VEHICLE TRANSMISSION

BACKGROUND OF THE INVENTION

Field of the Invention

The invention relates to a control device, in particular for an automatic motor vehicle transmission, including an electronic circuit, the electronic circuit is mounted on a substrate and accommodated in a housing that is sealed with respect to a surrounding fluid, and the electronic circuit is connected to electrical conductors that run outside the housing.

Such control devices are used in motor vehicles, in particular as control devices for automatic transmissions. Advanced electronic transmission control devices are integrated directly into the transmission for reasons of costs and quality. For that purpose, a housing containing the transmission controller is integrated into the transmission housing. Such a transmission controller, which is also referred to as being fully integrated, is described in Published European Patent Application 0 758 726 A2, corresponding generally to U.S. application Ser. No. 09/042,449, filed Mar. 16, 1998.

In order to be suitable for installation in a transmission housing, the control device must be capable of functioning over a wide temperature range, for example from −40° C. to 140° C. In addition, it must be sealed with respect to all customary types of transmission oil (so-called ATF oils), and finally it must be sufficiently vibration-proof (for example up to accelerations of 20 g).

It is known to seal components which are accommodated on a carrier plate mounted in the interior of the housing of the control device with a silicone rubber in commercial practice. The sealing compound is introduced at room temperature and then cured at an elevated temperature (for example at 110° C. for one hour). The housing of the control device must be very carefully sealed in order to reliably prevent the ingress of transmission oil. The ingress of transmission oil into the control device would cause the silicone rubber to swell up, as a result of which, in particular, bonding wires could be damaged, leading to a failure of the control device.

SUMMARY OF THE INVENTION

It is accordingly an object of the invention to provide a control device, in particular for an automatic motor vehicle transmission, which overcomes the hereinafore-mentioned disadvantages of the heretofore-known devices of this general type, which is reliably protected against ambient influences and which is simple to manufacture.

With the foregoing and other objects in view there is provided, in accordance with the invention, a control device, in particular for an automatic motor vehicle transmission, comprising a housing sealed against surrounding fluid; a substrate; an electronic circuit mounted on the substrate and accommodated in the housing; electrical conductors connected to the electronic circuit and running outside the housing; and a filler contained in the housing and formed of a viscous fluid compatible with the surrounding fluid.

In accordance with another feature of the invention, the filler is transmission oil.

In accordance with a concomitant feature of the invention, there are provided connection lugs connected to the electronic circuit and led out of the housing in a pressure-tight manner. The connection lugs may be connected to the electrical connecting conductors.

The advantages of the invention lie in particular in the fact that the expenditure on the manufacture of the control device is lower since the curing process for the silicone rubber is dispensed with. In addition, it is considerably simpler to introduce a viscous fluid which is compatible with transmission oil into the housing of the control device, than to seal it with silicone rubber. Finally, the invention reduces the expenditure on the sealing of the control device since, in the event of a leak, transmission oil which possibly penetrates the control device cannot bring about a functional failure of the control device. The reliability of the control device is considerably increased.

Other features which are considered as characteristic for the invention are set forth in the appended claims.

Although the invention is illustrated and described herein as embodied in a control device, in particular for an automatic motor vehicle transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, partly-sectional, side-elevational view of a control device according to the invention; and FIG. 2 is a fragmentary, top-plan view of the control device according to FIG. 1.

DESCRIPTION OF THE PREFERRED EMBODIMENTS

Referring now in detail to FIGS. 1 and 2 of the drawings as a whole, there is seen a control device 1 which has a base plate 2 and a cover 3 (both made of aluminum) that are connected to a sealing frame 4 running all around between them. A sealing element 6 which also runs all around is inserted in each case into a lower and an upper groove of the sealing frame 4. The sealing elements 6 are manufactured from an oil-proof elastic material. The base plate 2, the cover 3 and the sealing frame 4 are connected to one another through the use of rivets 7 which are seen in FIG. 2. Moreover, they may also be bonded to one another, for example. Together, they form a housing 5 of the control device 1.

Only a left-hand half of the control device 1 is illustrated in the drawings. Since a right-hand half is symmetrical with respect thereto, a complete illustration would not provide any additional information.

An electronic circuit of the control device is formed through the use of components 8 and 9 which are mounted on a substrate 10 in the form of a ceramic plate. Conductor tracks, which are not illustrated herein individually since they are generally known, are provided on the substrate 10.

The electronic circuit is implemented as a hybrid circuit, for reasons of space and because of the necessary temperature resistance. The components 9, 10 are constructed, for example, as integrated circuits without housings, so-called "bare chips" and they are mounted on the substrate 10 with a conductive silver bonding agent. The electrical connections on the substrate are produced by bonding, for example with gold wire having a diameter of 30 or 60 μm. A connection of the electronic circuit on the substrate 10 to terminal lugs 12 leading toward the outside is made through the use of bonding wires 14, for example 150 μm gold wire.

The connection lugs 12 are embedded in the sealing frame 4 or led through it in a pressure-tight manner. Outside the control device they are connected to electrical connecting conductors 15 which are constructed, for example, as punched grids or lattices made of a copper alloy that is embedded in a supporting element 16 made of plastic. The connection is preferably made through the use of resistance welding. The connection lugs 12 can also be led out of the housing 5 on all four sides, and in addition they can be constructed as round pins pressed into the sealing frame 4.

The electrical connecting lines 15 are disposed on the supporting body 16 and are unbraided, i.e. taken apart, as is clear from FIG. 2. They are attached to the supporting element 16, for example by being clipped in or riveted, and they lead to devices to be controlled (for example to valves), to sensors (for example rotational speed, temperature or pressure sensors), and to an equipment plug through which a connection to a power supply, to a data bus in the motor vehicle, to a serial interface, etc. is made. The devices connected to the electrical connecting lines 15 are known per se and are therefore not illustrated herein.

The interior of the control device 1 contains a filler 18 made of a viscous fluid which is compatible with a fluid that surrounds the control device 1 in the installed state. When the control device 1 is used as a transmission controller, the filler expediently is a transmission oil. After the viscous fluid has been introduced, the housing 5 is closed in a sealed manner, for example by pressing a sphere into a non-illustrated filling opening.

The fluid referred to as being compatible in this case is one having properties that are not adversely affected if the fluid which surrounds the control device 1 from the outside penetrates its interior as a result of possible leaks. An example of a fluid which is suitable for the filler 18 is the Automatic Transmission Fluid Shell ATF-3403.

The filler 18 has a vibration-damping effect, can compensate temperature differences which occur and, as a result of its low viscosity, reliably fills all of the hollows in the control device. Mutually compatible transmission oils are found both outside and inside the control device 1, when the control device is installed in a transmission housing. Therefore, there is no risk of a functional failure of the control device in the event of a possible leakage, specifically over the entire service life of the control device.

I claim:

1. A control device, comprising:
   a housing sealed against surrounding fluid;
   a substrate accommodated in said housing;
   an electronic circuit mounted on said substrate;
   electrical conductors connected to said electronic circuit and running outside said housing; and
   a filler contained in said housing and formed of a viscous fluid compatible with the surrounding fluid.

2. The control device according to claim 1, wherein said filler is transmission oil.

3. The control device according to claim 1, including connection lugs connected to said electronic circuit and led out of said housing in a pressure-tight manner.

4. The control device according to claim 1, including connection lugs led out of said housing in a pressure-tight manner and connected to said electrical connecting conductors.

5. In an automatic motor vehicle transmission, a control device comprising:
   a housing sealed against surrounding fluid;
   a substrate accommodated in said housing;
   an electronic circuit mounted on said substrate;
   electrical conductors connected to said electronic circuit and running outside said housing; and
   a filler contained in said housing and formed of a viscous fluid compatible with the surrounding fluid.

\* \* \* \* \*